US009889820B2

(12) United States Patent
Yap

(10) Patent No.: US 9,889,820 B2
(45) Date of Patent: Feb. 13, 2018

(54) CAR THEFT TRACKING SYSTEM AND METHOD

(71) Applicant: Continental Automotive GmbH, Hannover (DE)

(72) Inventor: Kung Leng Yap, Singapore (SG)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 15/300,906

(22) PCT Filed: Apr. 2, 2014

(86) PCT No.: PCT/IB2014/060373
§ 371 (c)(1),
(2) Date: Sep. 30, 2016

(87) PCT Pub. No.: WO2015/150870
PCT Pub. Date: Oct. 8, 2015

(65) Prior Publication Data
US 2017/0015278 A1    Jan. 19, 2017

(51) Int. Cl.
*B60R 25/33* (2013.01)
*G08B 25/10* (2006.01)
(Continued)

(52) U.S. Cl.
CPC ............ *B60R 25/33* (2013.01); *B60R 25/102* (2013.01); *G08B 25/016* (2013.01); *G08B 25/10* (2013.01); *H04W 4/14* (2013.01); *H04W 84/12* (2013.01)

(58) Field of Classification Search
CPC ..... B60R 25/102; B60R 25/33; G08B 25/016; G08B 25/10; H04W 4/14; H04W 84/12;
(Continued)

(56) References Cited

U.S. PATENT DOCUMENTS 5,673,305 A    9/1997  Ross
5,831,250 A   11/1998  Stephan
(Continued)

FOREIGN PATENT DOCUMENTS

WO    2006-028484 A1    3/2006

OTHER PUBLICATIONS

International Search Report and Written Opinion dated Dec. 12, 2014 from corresponding International Patent Application No. PCT/IB2014/060373.

*Primary Examiner* — Hirdepal Singh

(57) ABSTRACT

The current specification discloses a method, system and devices for detecting a theft of a car. A use of the car and a current location of the car are detected. A car identifier and location information indicative of a location of the car is sent to a network server over a wireless connection. A token device is determined that is associated with the car identifier and a location request is sent from the network server to the token device. Location information indicative of a current location of the token device is derived and the received location of the car is compared with the derived location of the token device. If a position mismatch between the location of the car and the location of the token device is detected, a warning message is sent to a pre-determined device.

10 Claims, 3 Drawing Sheets

(51) Int. Cl.
*B60R 25/102* (2013.01)
*G08B 25/01* (2006.01)
*H04W 4/14* (2009.01)
*H04W 84/12* (2009.01)

(58) Field of Classification Search
CPC . D06H 1/02; A43D 8/00; B41J 3/4078; C14B 1/28
USPC .......................................................... 340/993
See application file for complete search history.

(56) References Cited

U.S. PATENT DOCUMENTS

| | | | |
|---|---|---|---|
| 5,898,391 A | 4/1999 | Jefferies et al. | |
| 6,678,612 B1 | 1/2004 | Khawam | |
| 6,853,910 B1* | 2/2005 | Oesterling | B60R 25/2018 |
| | | | 342/357.64 |
| 9,669,800 B2* | 6/2017 | Yeh | G07C 9/00309 |
| 2011/0215949 A1* | 9/2011 | Yarnold | G08G 1/123 |
| | | | 340/989 |
| 2012/0197488 A1* | 8/2012 | Lee | H04L 63/0861 |
| | | | 701/36 |
| 2013/0214917 A1* | 8/2013 | Chung | B60R 25/1004 |
| | | | 340/426.19 |
| 2014/0309860 A1* | 10/2014 | Paulin | B60B 3/165 |
| | | | 701/36 |
| 2016/0129960 A1* | 5/2016 | Akins | H04W 4/02 |
| | | | 340/427 |
| 2016/0203651 A1* | 7/2016 | Heath | G06Q 50/30 |
| | | | 705/13 |
| 2016/0267435 A1* | 9/2016 | Eid | G06Q 10/109 |
| 2017/0015277 A1* | 1/2017 | Lisi | B60R 25/102 |

* cited by examiner

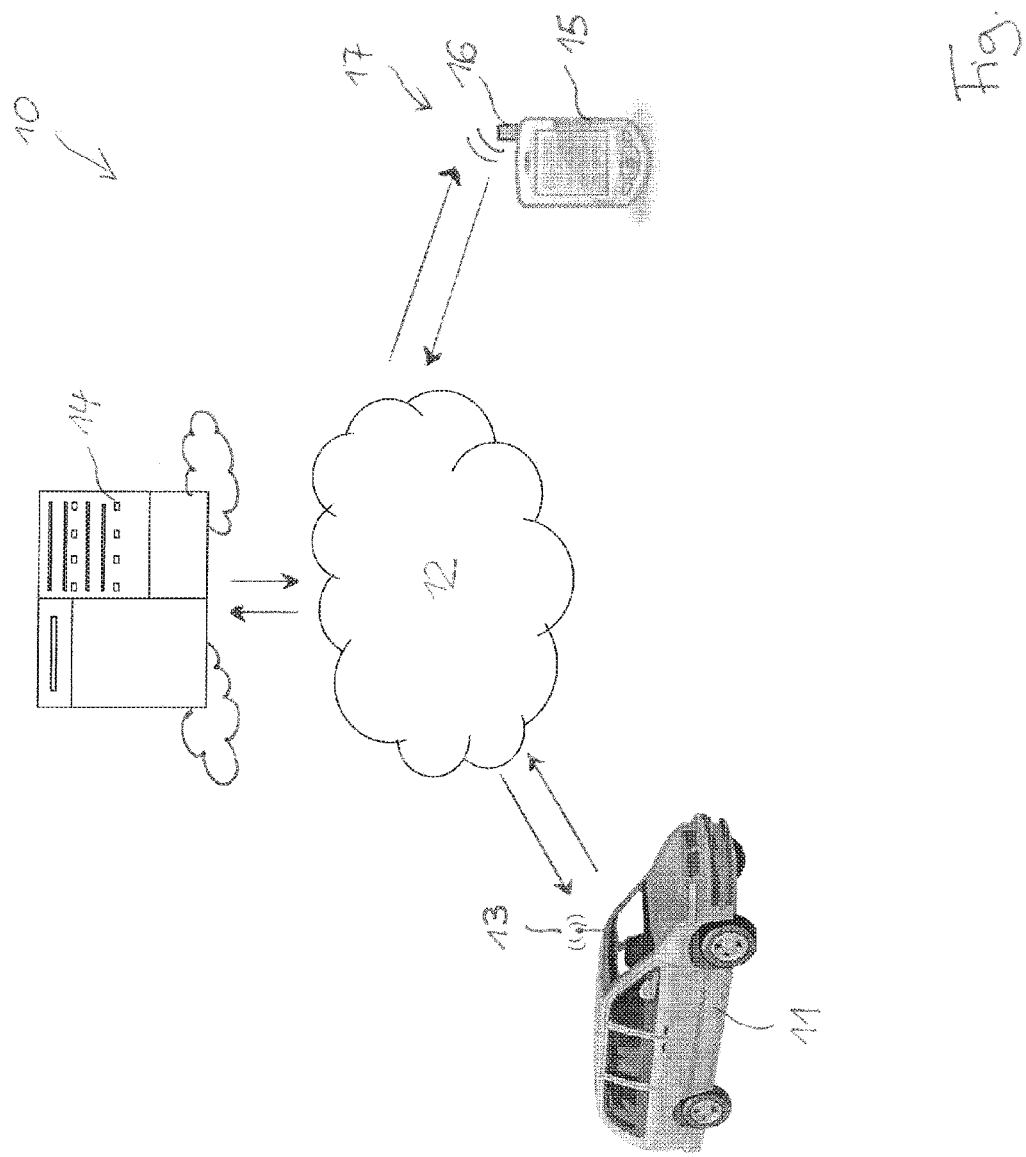

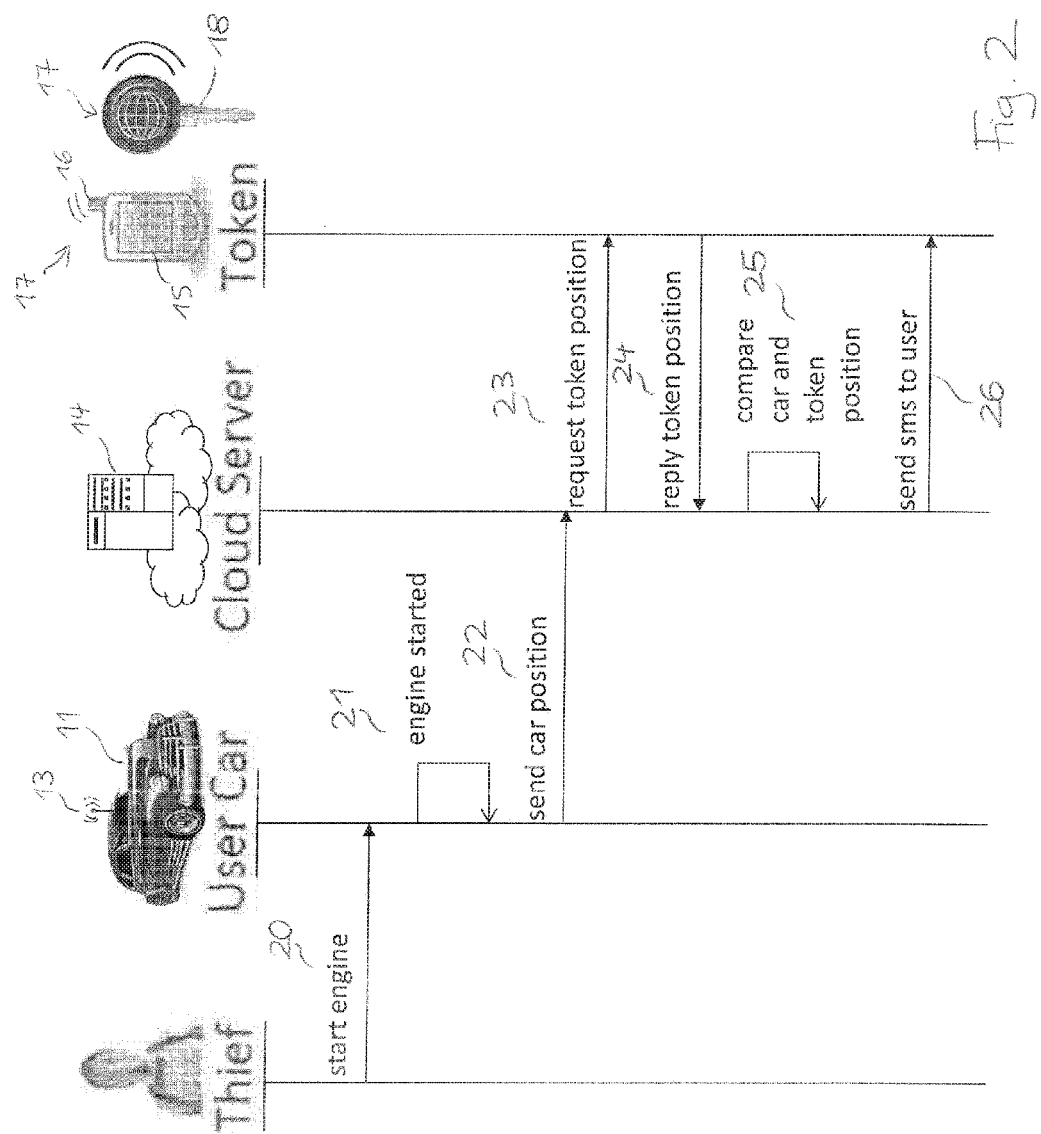

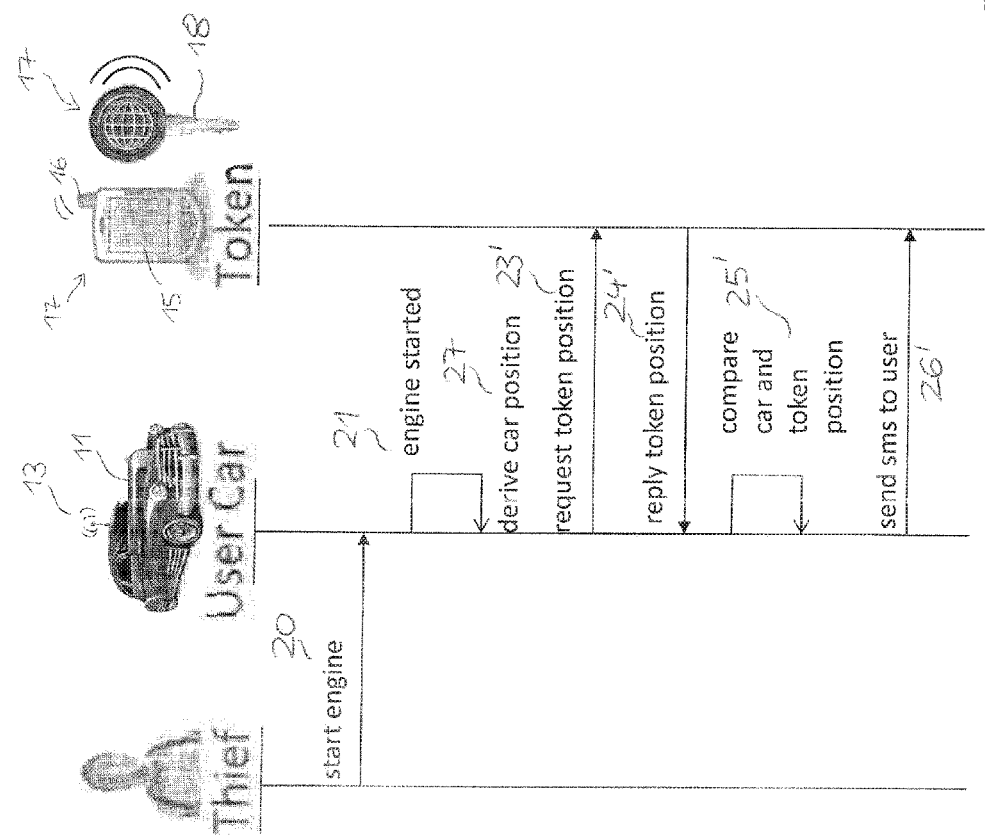

CAR THEFT TRACKING SYSTEM AND METHOD

The application relates to a car theft tracking system.

Worldwide availability of cellular networks and global positioning systems provides a way of tracking assets that are provided with tracking equipment capable of sending and receiving electromagnetic signals and receiving or evaluating position information. For example, EP 1484731 discloses a stolen-vehicle detection system in which a car theft is detected and a car position is tracked if the car is moved during a scheduled parking time.

The subject of the current specification provides an improved system and method for detecting a theft of a car with tracking equipment.

In a first aspect, the present specification discloses a first computer implemented method for detecting a car theft using a network server, such as web server, a web server provided by a cloud server or another type of network server. A use of the car, such as an activation of the car's ignition or of the starter motor, a switching on of the car's battery supply, a release of a fuel supply, a release of the car's steering system, a running of a car's motor, or a movement of the wheels is detected. Herein, the car comprises a combustion engine, an electric motor or also a hybrid engine.

A current geographical location of the car is detected, for example by using a satellite navigation system of the car or of a tracking equipment of the car that is capable of receiving and processing satellite location signals, or by determining the current location of the car using a location server, for example of a cellular network or of a WLAN, or by using a previously stored location and information about velocity and steering angle of the car to determine the current location of the car.

A car identifier and location information indicative of a location of the car is sent from the car to the network server over a wireless connection, in the sense that at least the transmission path from the car to an access point is wireless.

A token device is determined that is associated with the car identifier, wherein "token device" may refer in particular to a portable hand-held device, which is capable of sending, processing and emitting electromagnetic signals. This may be done for example by looking up a reference of a stored reference list at the network server. In particular, a mobile phone, a smart car key, a PDA, a smart watch, a tablet computer, or a laptop may provide the token device.

The smart watch may be provided, by way of example, by an internet capable watch with a touch screen. The communication means of the watch is operative to communicate with a wireless network and/or with communication equipment of the car. In case the smart watch is capable to communicate with the car, the smart watch may be provided with a signal generator for generating door opening and door closing signals, thereby functioning as a smart key. In a further embodiment, the smart watch is provided with a signal generator that is operative to generate a signal for disabling the car. In yet a further embodiment, the smart watch is provided with a signal generator that is operative to generate a signal for causing the car to send location signals in periodic time intervals, the location signals informing about the car's current location.

In a further step, a location request is sent from the network server to the token device. The network server derives a geographical location of the token device. This may comprise, in particular, comprising receiving message from the token device that is indicative of a current location of the token device or by accessing a stored location of the token device, by automatically deducing the location of the token device using a suitable algorithm.

According to one embodiment, the location of the token device is derived by receiving a location message of the token device in response to the location request. The location message is indicate of a current location of the token device or of a previous location of the token device, which is stored in a memory of the token device. The location message is evaluated and a location of the token device is determined from the location message.

According to another embodiment, the deriving of the token location takes into account that the token device may not be available at all times. This method comprises waiting a predetermined time for a response to the location request. This may comprise resending location requests during the waiting period. If a response to the location request is received from the token device, the location of the token device is derived from the location request. If this is not the case, the location of the token device is set to a pre-determined value. This pre-determined value may indicate, among others, that the token device is remote from the car or unknown, or equal to a value stored in memory.

The received location of the car is compared with the derived location of the token device. If a position mismatch between the location of the car and the derived location of the token device is detected a warning message is sent to a predetermined device, for example the token device. In particular, a position mismatch is detected if the token device is further away from the car than a pre-determined distance.

In a further embodiment, it is determined whether the location of the token device is older than a token expiry time. The token expiry time may increase with increasing distance of the token device from the car. For example, if a location of the token device is 20 km away from the car location, a processing device may infer that the car user is not likely to be at the car within the next 15 minutes and set the token expiry time to 15 minutes.

In particular, this may comprise deriving a time of a stored location information of the token device and determining a time difference between the time of the location information of the token device with a current time. If the time difference is smaller than a pre-determined time, a location of the token device is derived from the location information, and else a location of the token device is set to a predetermined value, such as "unknown", for example. The time difference may be determined by the recipient of the response message from the token device, such as the network server or the car, and/or by the token device. For example, if the token device can be contacted but a location information is not currently available to the token device, the token device may access a stored location that is older than the expiry time.

In addition or alternatively, a time of the token location is compared with a time of the car location. Accordingly, a time of a location information of the token device is determined, and a time difference between the time of the location information of the token device with a time of the location information of the car is computed. If the time difference is smaller than a pre-determined time a location of the token device is derived from the received location information of the token device, else a location of the token device to is set to a pre-determined value, such as "unknown". This computation is carried out by a recipient of the response message of the token device, such as the network server or the car.

The location of the car may be determined using various methods such as determining a current location of the car by a satellite positioning system of the car or of the car's tracking equipment, by determining the current location of the car by using a position server of a wireless access provider, such as a cellular network or a WLAN. A further method comprises using a previously stored location and information about velocity and steering angle of the car to determine the current location of the car.

Similarly, the token location may be determined using various methods such as determining the current location of the token by a satellite navigation system of the token device, by determining the current location of the token device by receiving signals from a position server of a cellular network, a WLAN or other wireless provider.

Furthermore, according to one embodiment, a tracking equipment of the car sends a message from to the token device to check availability of the token device in the car or to determine a distance of the token device by using WLAN, Bluetooth or other wireless communication channels. If the token device is a mobile phone, the tracking equipment may an access point of a mobile phone. By directly sending a message to the token device, a possibly time consuming communication with a network server can be avoided. In addition or if the token device cannot be reached directly, the tracking equipment sends a location request via the network server. According to a second computer implemented method, which does not involve a network server, the car communicates with the token device, either directly or via a network. A use of the car is detected and a message is sent from the car to a token device, the message comprising a location request.

A location of the token device is determined and the determined location of the car is compared with the derived location of the token device. If a position mismatch between the location of the car and the location of the token device is detected a warning message is sent to a pre-determined device. A position mismatch is detected if a distance between the token device is further away than a pre-determined distance.

For the sake of brevity, those alternative embodiments which apply to the first and the second computer implemented method are not repeated here. In a further aspect, the present specification discloses a smart key for a car with a means for operating a car door lock, such as a key blade and/or a signal generator for sending opening/closing signals. Furthermore, the smart key comprises means for transmitting and receiving electromagnetic signals such as an antenna, a transceiver, a power supply. The smart key further comprises means for processing a location request message, means for determining a position of the smart key, for example by communication with a position server of mobile network, by receiving satellite location data, by accessing a stored location, by accessing a stored location that was transmitted from the car. The smart key further comprises means for responding to the location request message by sending a message that is indicative of a current location of the smart key.

In particular, an electronic circuit may provide the means for transmitting and receiving electromagnetic signals, the means for processing the location request message, the means for determining the position of the smart key, the means for processing the location request message and the means for responding to the location request message.

The smart key may be "active" and comprise a battery that is connected to the electronic circuit. In particular, the electronic circuit may comprise an integrated circuit for receiving, processing and sending messages.

In another embodiment, the smart key is "passive" in that it receives its energy from the car or from an alternating electromagnetic field. In particular, the smart key may use the energy from the location request message. To this end, the electronic circuit may comprise an energy storage, such as a coil, a capacitor, or an oscillator circuit for storing electric energy of an alternating electromagnetic field.

In a further aspect, the present specification discloses tracking equipment for a car, the tracking equipment with means for receiving a car activation signal, such as an electrical connection to a data bus of the car. The tracking equipment further comprises means for determining, in response to the car activation signal, a geographical location of the car, such as a satellite navigation system, or a location unit for the wireless reception of a position signal.

The tracking equipment further comprises means for generating a message using a car identifier and the location of the car and means for transmitting the message to a web server or to a token device. The means may be provided by electronic circuitry one or more integrated circuits, stored instruction sets or combinations thereof.

In a further embodiment, the tracking equipment is operative to perform the steps of the second computer implemented method, such as sending a location request message to a token device, in particular a hand-held portable token device, receiving a response to the location request message and deriving a position of the token device.

In a further aspect, the present specification discloses a first system for detecting a car theft comprising a car, a network server and a portable hand-held token device.

The car comprises tracking equipment with a means for receiving a car activation message, a means for determining a geographical location of the car, means for sending a location message over a wireless connection, such an antenna, a transceiver and a current supply. The location message is indicative of the location of the car.

The a portable hand-held token device comprises means for communicating with the web server over a wireless connection, means for determining a position of the portable hand-held token device and means for responding to a position request from the network server.

The network server comprises means for receiving a location message from the car, such as a modem, a transceiver, an antenna or similar device. Furthermore, the network server comprises means for sending a location request to the portable hand-held token device, such as an antenna, means for deriving a location of the portable hand-held token device, means for comparing the location of the car with the location of the portable hand-held device. The means for deriving the location and for other processing steps may be provided by one or more computers of the network server. In the case of a cloud server, the means may be distributed over a plurality of computers.

Furthermore, the present specification disclose a system for detecting a car theft comprising a car with a tracking equipment and a portable hand-held token device. The tracking equipment comprises-means for receiving a car activation message, means for determining a (geographical) location of the car, means for sending a location request to the portable hand-held token device over a wireless connection, means for receiving a location message from the portable hand-held token device, —means for deriving a location of the portable hand-held token device and means for comparing the location of the car with the location of the portable hand-held device.

The portable hand held token device comprises means for receiving a location request message from the car, means for determining a position of the portable hand-held token device and means for responding to the location request message from the car.

The subject of the present specification is now explained in more detail with respect to the following Figures in which FIG. 1 shows a car theft tracking system according to the present specification, FIG. 2 shows a sequence diagram for a first method of operating the car theft tracking system, and FIG. 3 shows a sequence diagram for a second method of operating the car theft tracking system.

In the following description, details are provided to describe the embodiments of the present specification. It shall be apparent to one skilled in the art, however, that the embodiments may be practised without such details.

FIG. 1 shows a car theft tracking system 10 according to the present specification. A tracking equipment of the tracking system 10 is provided in a car 11. The tracking equipment, which is not shown in FIG. 1, is communicatively connected to a network 12 over an antenna 13. A cloud server 14 of the tracking system 10 is communicatively connected to the network 12 and a mobile terminal unit (MTU) 15 is communicatively connected to the network 12 over an antenna 16.

The cloud server 14 is provided by computational resources on one or more physical server computers. The number of computational resources and the number of physical server computers, which represent the cloud server, may vary over time according to a centralized or to a decentralized distribution scheme, such as, for example, a load balancing scheme. Furthermore, the cloud server may be configured to emulate hardware resources, for example by emulating a single processor by a multitude of processors.

The MTU 15 comprises a computer readable storage medium, which is not shown in FIG. 1, with application specific software. The application specific software of the MTU 15 comprises instructions for processing location requests from the cloud server 14, for retrieving location information of the MTU 15, and for sending the location information of the MTU 15 to the cloud server 14.

A dynamic allocation of computational resources by a cloud server according to the present specification takes into account that the number of concurrent theft cases and the number of car theft tracking systems currently in use, which determine the demand of computational resources, cannot be easily predicted in advance. Furthermore, the distribution of computational resources can provide a redundancy in order to ensure that the cloud server 14 is available when a request is send.

A tracking equipment according to the current specification does not require extensive computational resources and may be realized as a part of the car radio or of the car entertainment system, for example. It may be realized by software components, by hardware components or by any combination thereof. The communication between the cloud server 14 and the MTU 15 is bidirectional. By contrast, in a simple embodiment a unidirectional communication from the car 11 to the cloud server 14 is sufficient.

FIG. 2 shows a first method of use of the car theft detection system 10. In a step 20, a driver 20 starts an engine, for example by turning an ignition key. The tracking equipment on board the car is activated and verifies that the engine has been started in a step 21. In a step 22, the tracking equipment determines a position of the car 11 and sends the car position to the cloud server 14 via the antenna 13.

According to the embodiments of the present specification, a position of the car can be determined in various ways, for example by using a satellite positioning system such as GPS, Galileo or GLONASS, by using a cellular network or by using other providers of position signals. Alternatively or in addition, a position of the car may also be determined using stored data about the velocity and the steering angle of the car. In one embodiment, the tracking equipment is provided by existing equipment of the car, such as the car entertainment system, in another embodiment it is provided as a separate unit with computer, wireless communication facility, separate power supply and data bus connection to the car electronics and in another embodiment, it is partially provided by a car's equipment and partially as separate equipment.

The tracking equipment of the car 11 sends the position of the car 11 in a message using a suitable communication protocol. According to one specific example, it sends the position in an e-mail message using a GPRS service of a cellular phone provider. The tracking equipment may also use other message formats, such as SMS, other communication standards, such as UTMS, cdma2000 or others, or other wireless services such as WIMAX, WIFI and WLAN. According to another example, the tracking equipment sends the position message directly to a communication satellite, similar to a satellite phone.

In a step 23, the cloud server 14 receives the car position and sends a request of a token position to a token device 17. In the example of FIG. 2, the token device 17 is provided by the mobile terminal unit 15. In another embodiment, the token device 17 is provided by an active key 18.

The communication between the virtual server 14 and the token device 17 may be carried out using various types of networks and wired and wireless communication channels such as a cellular network, the internet, a WLAN access point, an access point of a personal area network (PAN) such as Bluetooth, a transmission mast of a cellular network.

The cloud server 14 holds an identifier of the token device 17, such as a telephone number, a network address, a MAC address or the like which allows the cloud server 14 to direct the position request to the MTU 15. Furthermore, the cloud server 14 holds an identifier of the car 11. The identifier of the car is associated to the identifier of the MTU 15, thereby allowing the cloud server 14 to attribute a received message to a user car 11.

In a step 24, the MTU 15 determines its position, or, in other words, its geographical location, it includes its position in a reply message and sends the reply message back to the cloud server 14.

In a step 25, the cloud server 14 compares the first location information previously received from the car 11 with the corresponding second location information received from the token 15 and determines whether there is a position mismatch between the first and the second location. If this is the case, the cloud server 14 sends a warning message to the token and/or to any other specified device in a step 26.

The cloud server 14 takes into account the elapsed time between the location message from the car 11 and the location message of the token device 17 and triggers an appropriate action if the elapsed time exceeds a predetermined maximum time difference. The action may comprise, by way of example, including the time information into the warning message, not sending the warning message, sending a request to the car to resend the current location. In a simple embodiment, the cloud server compares the reception time of the location messages. For a more accurate determination of the elapsed time, on or both of the location messages may be provided with time information.

The cloud server 14 elapsed time compares the elapsed time with a pre-determined expiry time of the token data of the token device 17. The pre-determined expiry time of the token data is user-configurable and is preferentially 3 minutes or less.

In further embodiments, a last location of the token device and/or of the car is stored at the cloud server 14 and the stored location is compared with the received location or the two stored locations are compared.

According to one method of determining a position mismatch, a distance between the positions is computed and a position mismatch is determined when the distance is greater or equal to a predetermined distance. The predetermined distance is user configurable and may be set to a few meters, by way of example.

The procedure according to FIG. 2 may be modified in various ways. For example, the tracking equipment of the car 11 may poll the network for availability in pre-determined intervals. This takes into account that the network 12 and/or the cloud server 14 may not be available at all times. The tracking equipment may be provided with its own power supply to ensure round the clock operation.

In another embodiment, the cloud server 14 is operable to receive configuration messages, such as messages for deactivating or activating the theft tracking service, for specifying a car identifier, for providing a token identifier to be associated with the car identifier, or for specifying devices that are to receive a warning message of the cloud server 14. These configuration messages may be secured with a secret code. In a simple example, the secret code is identical to the car identifier.

The configuration messages take into account that a mobile phone of the user may not be with the driver when the user has forgotten the phone, when the phone is lost or when someone else uses the car. On the other hand, a user may also accidentally leave the phone in the car in which case the phone may be stolen together with the car and no warning triggered unless a different phone is specified.

An assignment to a different phone number may be done, for example, by marking a phone number as active, by moving it to the top of a list of stored phone numbers or by replacing a previously stored phone number.

In a further embodiment, the cloud server 14 is configured for repeated attempts to contact the MTU 15. This may be useful when the user has temporarily switched off the MTU 15, the MTU 15 is out of reach or an MTU battery is empty.

According to another embodiment, the cloud server 14 holds a list of identifiers of mobile terminal units 15. When the cloud 14 server receives a message with a car location, the cloud server 14 attempts to retrieve locations of all mobile terminal units 15 in the list for a pre-determined period of time and compares the received car location against all received MTU locations. Only if there is position mismatch for all received MTU locations the cloud server 14 sends a warning message to one or more pre-determined addressees.

In a further embodiment, the cloud server 14 is operable to receive a message to disable the car 11. In the event that the car user receives a warning message, the car user may decide to render the car 11 inoperable. If the cloud server 14 receives a message to render the car inoperable from the MTU 15 it forwards the message to the car 11. The tracking equipment of the car 11 forwards the message to the car electronics of the car 11. In response, the car electronics blocks the supply of fuel to the car 11 and saves the status of the car as "blocked". As further measure, the car may also activate a park lock as soon as the car is not moving anymore.

In a further embodiment, the car 11 sends its location to the cloud server 14 already in the moment when the car user leaves the car 11 or after the car 11 has been parked. In this case, the tracking equipment may determine a position of the car 11 on its own or it may also use the localization capabilities of the MTU 15 when the MTU 15 is inside or nearby the car 11.

In one embodiment, the active key 18 has capabilities to retrieve its position and to respond to a position request. In this case, the active key 18 functions similar to the MTU 15. In another embodiment, the active key 18 has capabilities to answer to a wireless request but not to determine its own position. The cloud server can then determine an approximate location of the active key by using the signal strength of the active key 18 and the location of the nearest wireless access point or access points over which the active key 18 communicates.

FIG. 3 shows a second method of use of the car theft detection system 10 that does not use a network server but, instead, uses a communication between the car 11 and the token device 17, either directly or via the network 12.

In a step 20, a driver 20 starts an engine of the car 11, for example by turning an ignition key. The tracking equipment on board the car 11 is activated and verifies that the engine has been started in a step 21. In a step 27, the tracking equipment determines a position of the car 11.

In a step 23', the tracking equipment of the car 11 send a location request message to the token device 17 via the antenna 13. In a step 24', the token device 17 sends a message including a location of the token device 17 to the car 11.

In a step 25', the tracking equipment of the car 11 compares the previously determined location of the car 11 with the corresponding second location information received from the token device 17 and determines whether there is a position mismatch between the first and the second location. If this is the case, the tracking equipment sends, in a step 26', a warning message to the token device 17 and/or to any other specified device over the antenna 13.

In particular, when the car 11 does not directly communicate with the token device 17 but over a network, it may determine an elapsed time between a location information of the car and a location information of the token device, similar to the embodiment of FIG. 2.

In a first modification to the embodiment of FIG. 3, the tracking equipment determines a position mismatch if it does not receive a message from the token device. In a second modification to the embodiment of FIG. 3, the tracking equipment determines a position mismatch if a received signal strength from the token device 17 lies below a pre-determined threshold. In these modified embodiments, the token device 17 does not need to provide a capability to determine its own position but it only needs to provide a capability to respond to request messages of the car's tracking equipment.

The token device 17 of the embodiments of FIG. 2 or FIG. 3 may be provided as active device with its own power supply, such as a battery or a capacity, or as a passive device that receives its energy supply through direct connection with the car's power supply or from the surrounding electromagnetic field. To this end, the token device 17 may be provided with suitable RFID technology. In particular, the token device 17 may store energy of an oscillating field with a coil of the token device 17 and use this stored energy to send a reply message.

The invention claimed is:

1. A method for detecting a theft of a car comprising:
   detecting a use of the car,
   detecting a current location of the car,
   sending a car identifier and location information indicative of a location of the car to a network server over a first wireless connection,
   the network server determining a token device that is associated with the car identifier,
   the network server sending a location request to the token device,
   the network server receiving a location message from the token device in response to the location request, the location message specifying a location of the token device, and
   the network server comparing the received location of the car with the location of the token device,
   wherein, if a position mismatch between the location of the car and the location of the token device is detected a warning message is sent to a pre-determined device.

2. The method according to claim 1, further comprising
   deriving a time of a location information of the token device, determining a time difference between the time of the location information of the token device with a current time and, if the time difference is smaller than a pre-determined time, deriving a location of the token device from the location information,
   or
   deriving a time of a location information of the token device, determining a time difference between the time of the location information of the token device with a time of the location information of the car and, if the time difference is smaller than a pre-determined time, deriving a location of the token device from the received location information of the token device,
   or,
   in case a response to the location request is not received or not received within a pre-determined time or the time difference is larger than a pre-determined time, setting the location of the token device to a pre-determined value.

3. The method according to claim 1, comprising determining the current location of the car by a satellite positioning system, a cellular network or by using a previously stored location and information about velocity and steering angle of the car, and determining the current location of the token by a global positioning system or a position server.

4. The method according to claim 1, wherein the token device is selected from a mobile phone, a car key, a PDA, a watch, a tablet computer and a laptop.

5. The method according to claim 1, comprising sending a message from a tracking equipment of the car to the token device to check availability of the token device in the car.

6. A method for detecting a car theft comprising
   detecting a use and a current location of the car,
   sending a message to a token device,
   deriving a location of the token device by deriving a time of a location information of the token device, determining a time difference between the time of the location information of the token device with a current time and, if the time difference is smaller than a pre-determined time, deriving a location of the token device from the location information, or deriving a time of a location information of the token device, determining a time difference between the time of the location information of the token device with a time of the location information of the car and, if the time difference is smaller than a pre-determined time, deriving a location of the token device from the received location information of the token device, and
   comparing the detected location of the car with the derived location of the token device,
   wherein, if a position mismatch between the location of the car and the location of the token device is detected, a warning message is sent to a pre-determined device.

7. The method according to claim 6, wherein deriving the location of the token device further comprises
   receiving a location message of the token device in response to the location request and deriving a location of the token device from the location message,
   or
   in case a response to the location request is not received or not received within a pre-determined time or the time difference is larger than a pre-determined time, setting the location of the token device to a pre-determined value.

8. The method according to claim 6, comprising
   determining the current location of the car by a satellite navigation system, by using a signal of a location server or by using a previously stored location and information about velocity and steering angle of the car, and
   determining the current location of the token by a global positioning system or by using a signal of a position server.

9. The method according to claim 6, wherein the token device is selected from a mobile phone, a PDA, a watch, a car key, a tablet computer and a laptop.

10. The method according to claim 6, comprising sending a message from a tracking equipment of the car to the token device to check availability of the token device in the car.

* * * * *